United States Patent
Xie et al.

(10) Patent No.: US 12,526,459 B2
(45) Date of Patent: Jan. 13, 2026

(54) REALTIME PRE-ENCODING CONTENT-ADAPTIVE GPU IMAGE DITHERING

(71) Applicant: GOOGLE LLC, Mountain View, CA (US)

(72) Inventors: Richard Xie, Cupertino, CA (US); Ramachandra Tahasildar, Cupertino, CA (US); Danny Hong, New York, NY (US); Alex Sukhanov, Sunnyvale, CA (US); Albert Julius Liu, Sunnyvale, CA (US); Beril Erkin, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 163 days.

(21) Appl. No.: 18/280,551

(22) PCT Filed: Mar. 10, 2021

(86) PCT No.: PCT/US2021/021741
§ 371 (c)(1),
(2) Date: Sep. 6, 2023

(87) PCT Pub. No.: WO2022/191836
PCT Pub. Date: Sep. 15, 2022

(65) Prior Publication Data
US 2024/0155160 A1    May 9, 2024

(51) Int. Cl.
*H04N 19/86* (2014.01)
*A63F 13/355* (2014.01)
(Continued)

(52) U.S. Cl.
CPC ........... *H04N 19/86* (2014.11); *A63F 13/355* (2014.09); *H04N 19/119* (2014.11); *H04N 19/186* (2014.11); *A63F 13/358* (2014.09)

(58) Field of Classification Search
CPC .... H04N 19/119; H04N 19/186; H04N 19/86; A63F 13/355; A63F 13/358
See application file for complete search history.

(56) References Cited

U.S. PATENT DOCUMENTS 6,182,034 B1    1/2001  Malvar
11,445,211 B1*  9/2022  Waggoner ............ H04N 19/136
(Continued)

FOREIGN PATENT DOCUMENTS

EP    2148300 A1    11/2012

OTHER PUBLICATIONS

International Preliminary Report on Patentability mailed Sep. 21, 2023 for International Application No. PCT/US2021/021741, 10 pages.

(Continued)

*Primary Examiner* — Jeremiah C Hallenbeck-Huber

(57) ABSTRACT

Real-time pre-encoding dithering techniques mitigate or eliminate banding and other graphical artifacts in video frames prior to such video frames being encoded for transmission to and display by one or more client devices. For each of one or more input video frames, one or more random seeds and a frame identifier are received, and a dithering process is initiated for each of one or more pixels of the input video frame. The dithering process includes generating a YUV noise vector based on the random seeds and on the frame identifier, computing a YUV representation of the input pixel based on RGB color information for the input pixel, and generating a dithered output pixel by adding the generated YUV noise vector to the YUV representation of the input pixel.

19 Claims, 7 Drawing Sheets

(51) Int. Cl.
*A63F 13/358* (2014.01)
*H04N 19/119* (2014.01)
*H04N 19/186* (2014.01)

(56) References Cited

U.S. PATENT DOCUMENTS

| | | | |
|---|---|---|---|
| 2005/0185001 A1* | 8/2005 | Feng | G09G 3/2055 345/597 |
| 2005/0276505 A1* | 12/2005 | Raveendran | H04N 19/117 382/268 |
| 2005/0286635 A1* | 12/2005 | Kumar | H04N 19/197 375/E7.176 |
| 2010/0027906 A1 | 2/2010 | Hara et al. | |
| 2010/0246689 A1* | 9/2010 | Filippini | H04N 19/124 375/E7.2 |
| 2012/0098995 A1* | 4/2012 | Yamada | H04N 1/405 348/E9.051 |
| 2013/0301740 A1* | 11/2013 | Guo | H04N 19/86 382/167 |
| 2014/0160146 A1 | 6/2014 | Barnhoefer | |
| 2015/0279319 A1* | 10/2015 | Zhu | G09G 5/02 345/694 |
| 2016/0301934 A1 | 10/2016 | Su et al. | |
| 2017/0076431 A1 | 3/2017 | Dai et al. | |
| 2017/0287378 A1* | 10/2017 | Ando | H04N 19/91 |
| 2020/0177767 A1* | 6/2020 | Kelly | H04N 9/64 |
| 2021/0304365 A1* | 9/2021 | Bhattacharjee | G06T 5/94 |

OTHER PUBLICATIONS

International Search Report and Written Opinion mailed Nov. 26, 2021 for International Application No. PCT/US2021/021741, 17 pages.

Anonymous, "Dither—Wikipedia", Jan. 26, 2017, <<https://en.wikipedia.org/w/index.php?title=Dither&oldid=762118152>>, Accessed Oct. 5, 2017, 9 pages.

Martin Evans, Blog 3.0, "Dithering About Dither In Which Some Noise Is Made", [Mar. 27, 2018] <<https://martindevans.me/game-development/2018/03/27/Dithering-About-Dither/>>, Accessed Aug. 23, 2023, 10 pages.

Nguyen, Tuong Q., "Fast Source-based Dithering for Networked Digital Video", https://cseweb.ucsd.edu/~pasquale/Research/Papers/spie94.pdf, Sep. 29, 2020, 11 pages.

Polok, Lukas et al., "Implementing Random Indexing on GPU", https://www.researchgate.net/publication/220953837_Implementing_random_indexing_on_GPU, Jan. 2011, 10 pages.

* cited by examiner

REALTIME PRE-ENCODING CONTENT-ADAPTIVE GPU IMAGE DITHERING

CROSS-REFERENCE TO RELATED APPLICATIONS

The present application is a U.S. National Stage under 35 U.S.C. § 371 of International Patent Application Serial No. PCT/US2021/021741, entitled "REALTIME PRE-ENCODING CONTENT-ADAPTIVE GPU IMAGE DITHERING" and filed on Mar. 10, 2021, the entirety of which is incorporated by reference herein.

BACKGROUND

"Cloud gaming" or "game streaming" typically involves executing a video game application on one or more remote servers and providing the resulting video and audio content as a video stream and audio stream, respectively, that is transmitted over one or more networks to a user's client device. By utilizing at least one remote server (i.e., "the cloud") to perform some or all aspects of the associated tasks of graphics rendering, video capture, video encoding, and video streaming, a user may run performance-taxing game applications without using a high-end hardware client device. Instead, the user may typically need only a display screen, a device capable of playing a video stream, and one or more user input devices.

However, due to video encoding processes typically utilized in cloud gaming scenarios, banding or other graphical artifacts may be visible in the provided output video stream, such as in dark or low-detail areas of the game content. These graphical artifacts may be distracting to the user, and may operate as a disincentive to use cloud gaming platforms.

SUMMARY OF EMBODIMENTS

In embodiments described herein, efficient real-time pre-encoding dithering techniques are provided for mitigating or eliminating banding and other graphical artifacts, such as may be useful in cloud gaming or other video streaming applications. In general, because the techniques are typically performed on the server side before encoding, client users at different endpoints may receive high-quality video output with reduced or negligible banding artifacts regardless of the client device used to consume the resulting provided content.

In certain embodiments, dithering methods described herein may be adaptive to local statistics of the content, such that a dynamic determination of whether to perform pre-encoding dithering with respect to each of multiple pixel groups may be made for each incoming video input frame. In some of these embodiments, the processing of each selected pixel group—each pixel group for which a dynamic determination has been made to perform the dithering process—may be assigned to a separate process thread initiated for each selected pixel group. In such embodiments, a two-dimensional thread-space may be partitioned for one or more graphics processors implementing these group-specific process threads.

In one example embodiment, a computer-implemented method may comprise, for each of one or more input video frames: receiving one or more random seeds and a frame identifier; and, for each of multiple input pixels of the input video frame, initiating a dithering process that includes generating a YUV noise vector based at least in part on the one or more random seeds and on the frame identifier, computing a YUV representation of the input pixel based on red-green-blue (RGB) component color information for the input pixel (i.e., an RGB component color information provided for/inherent to the input pixel), and generating a dithered output pixel by adding the generated YUV noise vector to the YUV representation of the input pixel. The method may further comprise providing a dithered output video frame for encoding that includes the dithered output pixels.

The method may further comprise, for each of at least one of the one or more input video frames, dividing the at least one input video frame into multiple pixel groups of substantially similar dimensions; and dynamically determining, for each respective pixel group of the multiple pixel groups, whether to initiate the dithering process with respect to the respective pixel group. Dynamically determining whether to initiate the dithering process with respect to the respective pixel group may be based at least in part on an average luminance value of pixels of the respective pixel group. Determining whether to initiate the dithering process with respect to the respective pixel group may be based at least in part on an average variance of pixels of the respective pixel group. The method may further comprise initiating a process thread for each pixel group for which it is dynamically determined to initiate the dithering process, such that each respective process thread performs the dithering process for pixels of the respective pixel group.

Generating the YUV noise vector may include computing an RGB noise vector based at least in part on the one or more random seeds and, in certain embodiments, on the frame identifier (which may be combined with the random seed or seeds in various manners in order to further distinguish the RGB noise vector from those used, e.g., for one or more adjacent video frames), and converting the computed RGB noise vector to a YUV representation of the RGB noise vector. In an exemplary embodiment, computing the RGB noise vector may include reading RGB values associated with an input pixel for which an RGB noise vector is to be computed and computing a random number for each RGB channel (red, green, blue) of the input pixel using the one or more random seed. For computing the random number for each RGB channel, a respective aggregated RGB value may be used in combination with the random seed for calculating values for the RGB noise vector. Calculation the values for the RGB noise vector may, for example, be performed using sinusoid-based and/or Euler-based noise functions. Additionally, computing the RGB noise vector may include computing a random number for each RGB channel, such as by taking into account a local and/or global coordinate of the input pixel within a pre-determined pixel group.

Computing the RGB noise vector may include scaling the RGB noise vector by a defined strength factor.

The method may further include applying one or more filters to the dithered output pixels prior to providing the dithered output video frame for encoding. The one or more filters include at least one Gaussian filter.

In another example embodiment, a system may comprise a first processor that is to receive, for each of one or more input video frames and from a second processor, one or more random seeds and a frame identifier; to initiate, for each of multiple input pixels of the input video frame, a dithering process; and to provide, for each of the one or more input video frames, a dithered output video frame for encoding that includes the dithered output pixels. The dithering process may include to generate a YUV noise vector based at least in part on the one or more random seeds and on the frame identifier, compute a YUV representation of the input pixel based on RGB color information for the input pixel, and generate a dithered output pixel by adding the generated YUV noise vector to the YUV representation of the input pixel.

The first processor may be, for at least one of the one or more input video frames, further to divide the at least one input video frame into multiple pixel groups of substantially similar dimensions, and to dynamically determine, for each respective pixel group of the multiple pixel groups, whether to initiate the dithering process with respect to the respective pixel group. To dynamically determine whether to initiate the dithering process with respect to the respective pixel group may be based at least in part on one or more of an average luminance value of pixels of the respective pixel group and an average variance of pixels of the respective pixel group. The first processor may be further to initiate a process thread for each pixel group for which it is dynamically determined to initiate the dithering process, such that each respective process thread performs the dithering process for pixels of the respective pixel group.

To generate the YUV noise vector may include to compute an RGB noise vector based at least in part on the one or more random seeds and on the frame identifier, and to convert the computed RGB noise vector to a YUV representation of the RGB noise vector.

The first processor may be further to apply one or more Gaussian filters to the dithered output pixels prior to providing the dithered output video frame for encoding.

The system may further comprise the second processor.

In another example embodiment, a server computing system may comprise a set of one or more processors to generate one or more input video frames via execution of a gaming application; to, for each of the one or more input video frames: generate a frame identifier and one or more random seeds; for each of multiple input pixels of the input video frame, generate a YUV noise vector based at least in part on the one or more random seeds and on the frame identifier, compute a YUV representation of the input pixel based on red-green-blue (RBG) color information for the input pixel, and generate a dithered output pixel by adding the generated YUV noise vector to the YUV representation of the input pixel; and encode a dithered output video frame that includes the dithered output pixels. The server computing system further comprises a network interface that is coupled to the set of one or more processors and that is configured to provide encoded output video frames to one or more client computing systems via at least one computer network.

The set of one or more processors may be further to, for at least one of the one or more input video frames: divide the at least one input video frame into multiple pixel groups of substantially similar dimensions, and dynamically determine, for each respective pixel group of the multiple pixel groups, whether to initiate the dithering process with respect to the respective pixel group. To dynamically determine whether to initiate the dithering process with respect to the respective pixel group may be based at least in part on one or more of an average luminance value of pixels of the respective pixel group and an average variance of pixels of the respective pixel group.

The set of one or more processors may be further to initiate a process thread for each pixel group for which it is dynamically determined to initiate the dithering process, such that each respective process thread performs the dithering process for pixels of the respective pixel group.

The set of one or more processors may be further to generate the YUV noise vector by computing an RGB noise vector based at least in part on the one or more random seeds and on the frame identifier, and by converting the computed RGB noise vector to a YUV representation of the RGB noise vector.

BRIEF DESCRIPTION OF THE DRAWINGS

The present disclosure is better understood, and its numerous features and advantages made apparent to those skilled in the art, by referencing the accompanying drawings. The use of the same reference symbols in different drawings indicates similar or identical items.

DETAILED DESCRIPTION

Figure 1:
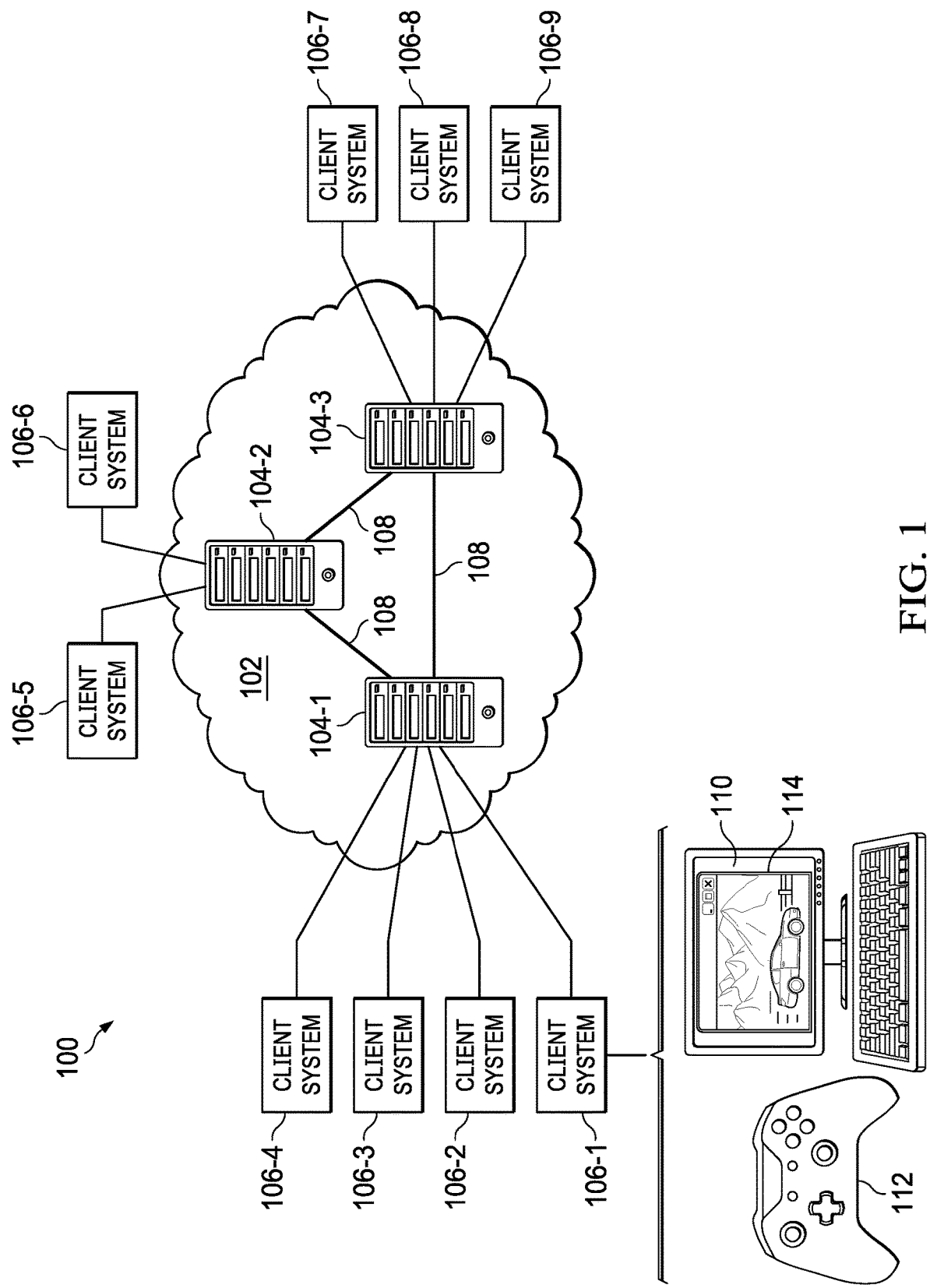
FIG. 1 is a block diagram illustrating a cloud gaming system facilitating multiplayer gaming via decentralized peer-to-peer player input and state messaging in accordance with some embodiments.

FIG. 1 is a block diagram illustrating a cloud gaming system 100 facilitating single-player and/or multiplayer (including massively multiplayer) gaming in accordance with at least one embodiment. The cloud gaming system 100 includes a cloud platform 102 having a plurality of servers 104 that are coupled to corresponding subsets of a plurality of client devices 106 via one or more networks, such as the Internet. The servers 104 are interconnected in the depicted embodiment via a high-bandwidth, low-latency inter-server messaging bus 108. The servers 104 typically are distributed in one or more data centers over a geographical area so as to reduce transmission latency through physical proximity. In the simplified example of FIG. 1, the cloud platform 102 includes three servers 104-1 to 104-3 supporting nine client devices 106-1 to 106-9, with client devices 106-1 to 106-4 served by server 104-1, client devices 106-5 and 106-6 served by server 104-2, and client devices 106-7 to 106-8 served by server 104-3. It will be appreciated that in a typical real-world implementation, the number of servers 104 and number of client devices 106 typically will be considerably higher.

In the depicted embodiment, each server 104 operates to execute a corresponding game platform instance that facilitates execution of one or more simulation instances of a gaming application for a corresponding player, each of these instances being referred to herein as a "player simulation instance." That is, the game platform instance provides various resources, such as communication/network management, resource management, media rendering encoding, and the like, so as to simulate execution of a gaming application for a corresponding player as though that gaming application was being played on a local gaming device, such as a personal computer (PC) or game console. Each player simulation instance thus represents execution, or simulation, of the gaming application for a corresponding player. To illustrate, a player instance can be considered to be a virtual game console; thus such instances are containers that enable a single game runtime including networking, rendering, audio and video encoding, streaming and receipt of user inputs for both single- and multi-player gaming applications.

Each client device 106 represents the hardware and software resources utilized to receive player input through manipulation of one or more input/output devices for at least one player, as well as to present the video and auto content representing the visual and audial content, respectively, of the gameplay for the at least one player. Examples of a client device 106 include a desktop computer, a notebook computer, a tablet computer, a compute-enabled cellular phone (that is, a "smart phone"), a compute-enabled television (that is, a "smart TV"), and the like. As illustrated with reference to client device 106-1, each client device 106 includes a display 110, at least one game controller 112, one or more network interfaces to couple to the network connecting the client device 106 to the corresponding server 104, processors, memory, mass storage, speakers, and other computing resources to process the incoming media streams as is well known in the art.

The client device 106 receives video and audio streams (not shown) generated from execution of a corresponding player simulation instance at a corresponding server 104, and utilizes its compute, storage, and display resources for decoding and displaying the video frames of the transmitted video stream and for decoding and outputting the corresponding audio content. In some embodiments, the processing and display of video and audio content from the gaming application executed at the server 104 is facilitated by a software application executed at the client device 106 (and represented in FIG. 1 by graphical user interface (GUI) 114). This software application can include, for example, a cloud-gaming-specific software application. In other embodiments, a more general software application is utilized, and the video stream and audio stream are formatted and transmitted by the server 104 to be compatible with this software application. For example, in one embodiment the client device 106 utilizes a web browser that utilizes a hypertext markup language (HTML) format for display of the video content represented by the video and output of the audio content represented by the associated audio stream, and the server 104 provides the video stream in a format and the audio stream in formats compatible with the HTML format for display via the web browser.

Being interactive, the executing player simulation instance utilizes player input to at least partially direct the gameplay experience of a gaming session with the player. This player input is received at least in part through the game controller 112, which comprises any of a variety of I/O devices or a combination thereof, such as a game pad, joystick, keyboard, mouse, touchpad, trackball, steering wheel or yoke, pedal, dance pad, simulated gun, optical motion tracker, inertial sensor, light/laser source and detector, and the like. In some embodiments, the game controller 112 is tethered to the client device 106 such that player input data generated by a player's manipulation of the game controller 112 is provided to the corresponding server 104 via the client device 106. To illustrate, the game controller 112 can be wired or wirelessly connected to the client device 106 such that all data output by the game controller 112 is routed through a network interface between the client device 106 and the network connecting the client device 106 to the server 104. In other embodiments, the game controller 112 has a separate, independent network connection with the corresponding server 104 via a network. For example, the cloud gaming system 100 could employ a wireless local area network (WLAN) access point (not shown) local to the client device 106 and the game controller 112 and connected to the Internet, and wherein each of the client device 106 and the game controller 112 establishes a separate wireless connection with the WLAN access point to independently communicate with the corresponding server 104 over the Internet via the WLAN access point.

As a general overview of the cloud gaming system 100, the servers 104 leverage the high bandwidth and low latency of the inter-server messaging bus 108 to implement a massively multiplayer game through the use of a peer-to-peer infrastructure that allows coordination of gameplay between the individual player simulation instances supported by each game platform instance without necessitating centralized multiplayer gaming servers, and thereby eliminating the need for expensive server farms, server operation teams, and other expenses typically involved in supporting massively multiplayer games through conventional centralized techniques.

Because maintaining low input latency (the delay between a user providing client input and receiving responsive server output from the game) contributes to a positive user experience for cloud gaming applications, such cloud gaming applications typically rely on relatively high bandwidth requirements. In order to meet these bandwidth requirements, and maintain a low-latency video stream, hardware-accelerated encoders (e.g., hardware-accelerated Advanced Video Coding (AVC) or "H.264" standard (such as version 1 as released on May 30, 2003, or any later version), VP9 (released on Jun. 17, 2013), and High Efficiency Video Coding (HEVC) (such as version 1 as released on Apr. 13, 2013, or any later version)) have been deployed on various cloud gaming platforms to ensure that the user is provided with high-quality graphics during gameplay. However, banding artifacts are often visible, such as in dark or low-detail areas of the video stream. These and other graphical artifacts may be distracting to the user, and may operate as a disincentive to use such cloud gaming platforms.

Figure 2:
FIG. 2 depicts an image of a video frame that has been processed by a typical hardware-accelerated encoder used to encode a game application output video stream.

FIG. 2 depicts an example single video frame 200 of an image encoded by a typical hardware-accelerated encoder used to encode game application output. The video frame includes several areas 205 (which in the illustration of FIG. 2 only explicitly indicates three such areas for clarity) that include several apparent banding artifacts, lowering the perceived quality of the video frame.

Such banding artifacts may result, for example, when a remote server executing a game application attempts to render a smooth gradient of color shades, such as a blue that only varies a little (in RGB color terms) across a large area of sky. An encoder may typically process input video frames using a block-oriented, motion-compensation-based video compression standard, which is not designed to compress small variations in pixels and may struggle with compressing the smooth sky gradient.

Eliminating such banding artifacts in real-time in order to stream high-quality video to different clients is a challenge for any cloud gaming platform to solve in order to attract more game players. The encoder may attempt to reduce any resulting banding artifacts by using a lower quantization parameter (QP) during compression, but such approaches do not typically eliminate them. In certain scenarios, such banding artifacts may become even more severe as a result of such solutions, because an associated network connection may require the encoder to increase its QP to meet a target bitrate.

Systems and techniques described herein are generally directed to embodiments of an efficient real-time pre-encoding dithering scheme for mitigating or eliminating banding and other graphical artifacts, such as may be useful in cloud gaming or other video streaming applications. In certain embodiments, the described scheme may be implemented using a graphics processor ("GPU"), such as via one or more GPU shader modules. In general, because the techniques are typically performed on the server side before encoding, client users at different endpoints (e.g., web browsers, mobile applications, and televisions) may receive high-quality video output with reduced or negligible banding artifacts regardless of the client device used to consume the resulting provided content.

In certain embodiments, dithering techniques described herein are adaptive to local statistics of the content, such that a dynamic determination of whether to perform pre-encoding dithering with respect to each of multiple pixel groups may be made for each incoming video input frame. In some of these embodiments, the processing of each selected pixel group—each pixel group for which a dynamic determination has been made to perform the dithering process—is assigned to a separate process thread initiated for each selected pixel group. In such embodiments, a two-dimensional thread-space may be partitioned for one or more graphics processors implementing these group-specific process threads.

It will be appreciated that while techniques are discussed herein with respect to encoding, decoding, and transmission of video content that may utilize particular examples relevant to cloud gaming and game content, such discussions and techniques may be applied to additional non-gaming contexts, such as image and video encoding, decoding, and transmission. Examples provided herein may refer to scenarios involving the encoding and transmission of gaming content due to particular bandwidth and network latency issues relevant to such content, and should not be construed to indicate that the techniques described are limited to those scenarios.

Figure 3:
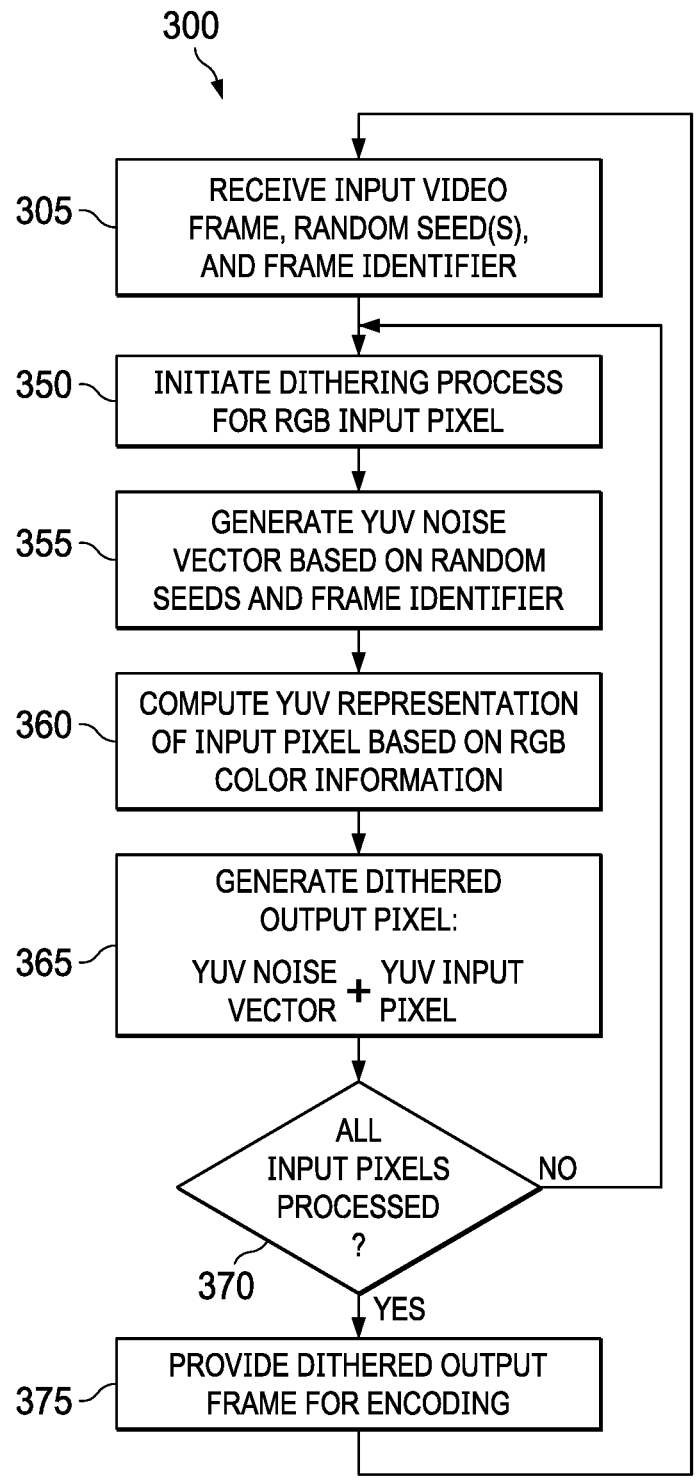
FIG. 3 is a block diagram illustrating an overview of operations of a real-time pre-encoding dithering system in accordance with one or more embodiments.

FIG. 3 is a block diagram illustrating an overview of an operational routine 300 of a processor-based real-time pre-encoding dithering system (such as any of servers 104 of FIG. 1, or computing system 700 of FIG. 7, described below) in accordance with one or more embodiments. In certain embodiments, the operational routine 300 may be performed in real-time (e.g., as each video frame of a larger video stream is generated) in order to prepare one or more video image frames for encoding and transmission, such as if such video image frames are generated as part of sequential output from a game application being executed by one or more servers of a cloud gaming platform.

The routine begins at block 305, in which a processor-based dithering system receives an input video frame, a frame identifier, and one or more random seeds (as used to initialize a random or pseudorandom number generator of one or more processors). In various embodiments, the random seeds and frame identifier may be generated by a first processor, such as a single- or multi-core central processing unit (CPU), and provided to a distinct second processor (such as a single- or multi-core GPU) for dithering and/or other operations prior to the encoding of the input video frame for transmission to one or more client devices. The routine proceeds to block 350.

At block 350, the processor-based dithering system initiates a dithering process for an input pixel associated with color values provided in the RGB (red-green-blue) domain. The routine proceeds to block 355 as part of that dithering process.

At block 355, the processor-based dithering system generates a noise vector in the YUV domain based on the received random seeds and frame identifier associated with the input video frame. YUV is a color encoding system designed to account for human perception, and is typically used as part of a color image pipeline. The YUV model defines a color space in terms of one luminance component (Y) and two chrominance components, called U (blue projection, that is, blue minus luma) and V (red projection, that is, red minus luma) respectively. In certain scenarios, the YUV domain enables reduced bandwidth for chrominance components, thereby typically enabling transmission errors or compression artifacts to be more efficiently masked by human perception than using a "direct" RGB representation. The YUV color model is often used in the Phase Alternating Line (PAL) composite color video standard.

It will be appreciated that by generating the noise vector based at least in part on the unique frame identifier associated with a particular input video frame, the dithering system may generally avoid scenarios in which a human user perceives a degree of constancy between the noise added to sequential video frames.

In certain embodiments, the generation of the YUV noise vector may include the following operations, expressed as a set of pseudo-instructions that each may be effectuated as one or more computer-readable instructions that, when executed, manipulate at least one processor of the dithering system to perform the corresponding operation:

Read the RGB values associated with the current input pixel: input_color=[r,g,b]

Set an aggregated RGB value total_rgb to input.r+input.g+input.b, where each of input.r, input.g, and input.b is a numeric value respectively representing a relative color component for the corresponding red, green, and blue component of the color of the current input pixel.

Compute a random number for each RGB channel based on one or more random seeds. For example, in an embodiment the following functions may be used respectively to compute a random number grain0, which is used to provide sinusoid-based and Euler-based noise for the red channel based on a first random seed (seed0), a random number grain1, which is used to provide sinusoid-based and Euler-based noise for the green channel based on a second random seed (seed1), and a random number grain2, which is used to provide sinusoid-based and Euler-based noise for the blue channel based on a third random seed (seed2):

grain0=(sine_noise(shared_sample_id+uvec2 (33*seed0*total_rgb, 9*seed0*total_rgb))+euler_ noise(global_sample_id.yx,seed0))−1.0 grain1=(sine_noise(shared_sample_id.yx+uvec2 (13*seed1*total_rgb, 7*seed1*total_rgb))+euler_ noise(global_sample_id,seed1))−1.0 grain2=(sine_noise(shared_sample_id+uvec2 (19*seed2*total_rgb, 31*seed2*total_rgb))+euler_ noise(output_resolution−global_sample_id,seed2))− 1.0

Where shared_sample_id and global_sample_id refer to a local coordinate for the current input pixel within the current pixel group and a global coordinate of the current pixel group, respectively.

Generate an RGB noise vector as noise_rgb=[nr,ng,nb], where nr=grain0, ng=grain1,nb=grain2

Set a noise strength factor strength_factor to a value between 0.0 and 1.0.

Scale the generated RGB noise vector by the noise strength factor [nr',ng',nb']=[nr,ng,nb]*strength_factor Convert the (optionally scaled) RGB noise vector [nr',ng', nb'] to a YUV-domain noise vector [ny',nu',nv']

In certain embodiments, the euler_noise function indicated above may return a floating-point value that may be defined as:

```
float EULER = 2.71828182845904523536;
float euler_noise(xy, seed){
    return fract(tan(distance(xy*EULER, xy)*seed)*xy.x)
}
```

In certain embodiments, the sine_noise function indicated above may return a floating-point value that may be defined as:

```
float sine_noise(coord){
    return fract(sin(dot(coord.xy ,vec2(13.9798,88.735))) * 52739.7451)
}
```

It will be appreciated that in certain embodiments, setting the noise strength factor and scaling the generated RGB noise vector by that noise strength factor may be omitted.

After generating the YUV noise vector, the routine proceeds to block 360, and computes a YUV representation of the input pixel based on the RGB color information associated with that input pixel. Expressed as a pseudo-instruction in a manner similar to that used above, [r,g,b] is converted to [y,u,v]. The routine then proceeds to block 365.

At block 365, the processor-based dithering system generates a dithered output pixel by adding the generated YUV noise vector to the converted YUV representation of the original input pixel, such that dithered output pixel [y',u',v']= [y,u,v]+[ny',nu',nv']. The routine then proceeds to block 370, in which the processor-based dithering system determines whether all input pixels of the received input video frame have been processed. If not, the routine returns to block 350 and initiates the dithering process for the next input pixel of the input video frame.

If it is determined in block 370 that all input pixels of the input video frame have been processed, the routine proceeds to block 375, in which the processor-based dithering system provides a dithered output video frame for encoding and transmission. In certain embodiments, the processor-based dithering system may additionally apply one or more filters to the dithered output pixels prior to providing the data output video frame for encoding. As one non-limiting example, a Gaussian filter may be applied, such as using a five-tap 3×3 kernel similar to the following:

$$\begin{bmatrix} 0 & 1 & 0 \\ 1 & 8 & 1 \\ 0 & 1 & 0 \end{bmatrix} / 12$$

After providing the dithered output video frame for encoding and transmission, the routine then returns to block 305 in order to process a next video frame.

In certain embodiments, operations such as those described above may additionally provide for dynamically determining one or more portions of a larger input video frame on which to perform the dithering process. For example, in certain embodiments a video input frame may be divided into a quantity of similarly dimensioned pixel groups, which are individually analyzed to determine whether to dither the input pixels located within each particular pixel group.

Figure 4:
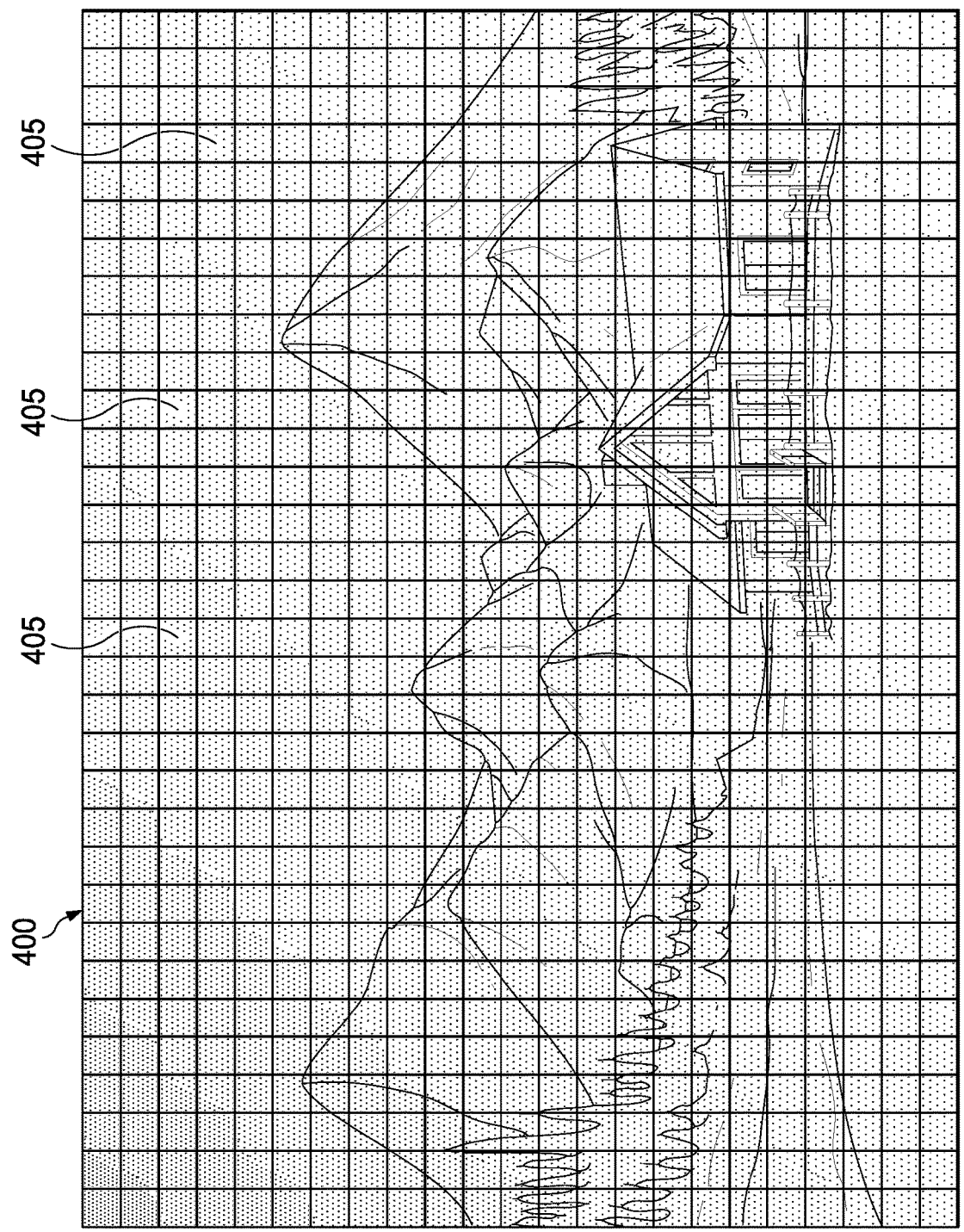
FIG. 4 depicts an image of a video frame to be processed by a real-time pre-encoding dithering system in accordance with one or more embodiments.

FIG. 4 depicts an image of a video frame 400 to be encoded by a real-time pre-encoding dithering system in accordance with one or more embodiments. The depicted video frame 400 is divided into a number of distinct pixel groups 405 (which in the illustration of FIG. 4 only explicitly indicates three of the larger quantity of pixel groups for clarity), such that each pixel group 405 is similarly dimensioned. For example, in certain embodiments each pixel group may be defined as a 32×32 pixel group; in such embodiments, each input video frame is therefore divided into (image_width/32)*(image_height/32) pixel groups. In certain embodiments, a two-dimensional thread-space may be created for use by one or more GPU shader modules, such that a separate process thread is assigned to each pixel group of the divided input video frame. In at least one embodiment, a dynamic determination regarding whether to initiate a dithering process for each particular pixel group may be made prior to assigning the separate processed threads.

Figure 5:
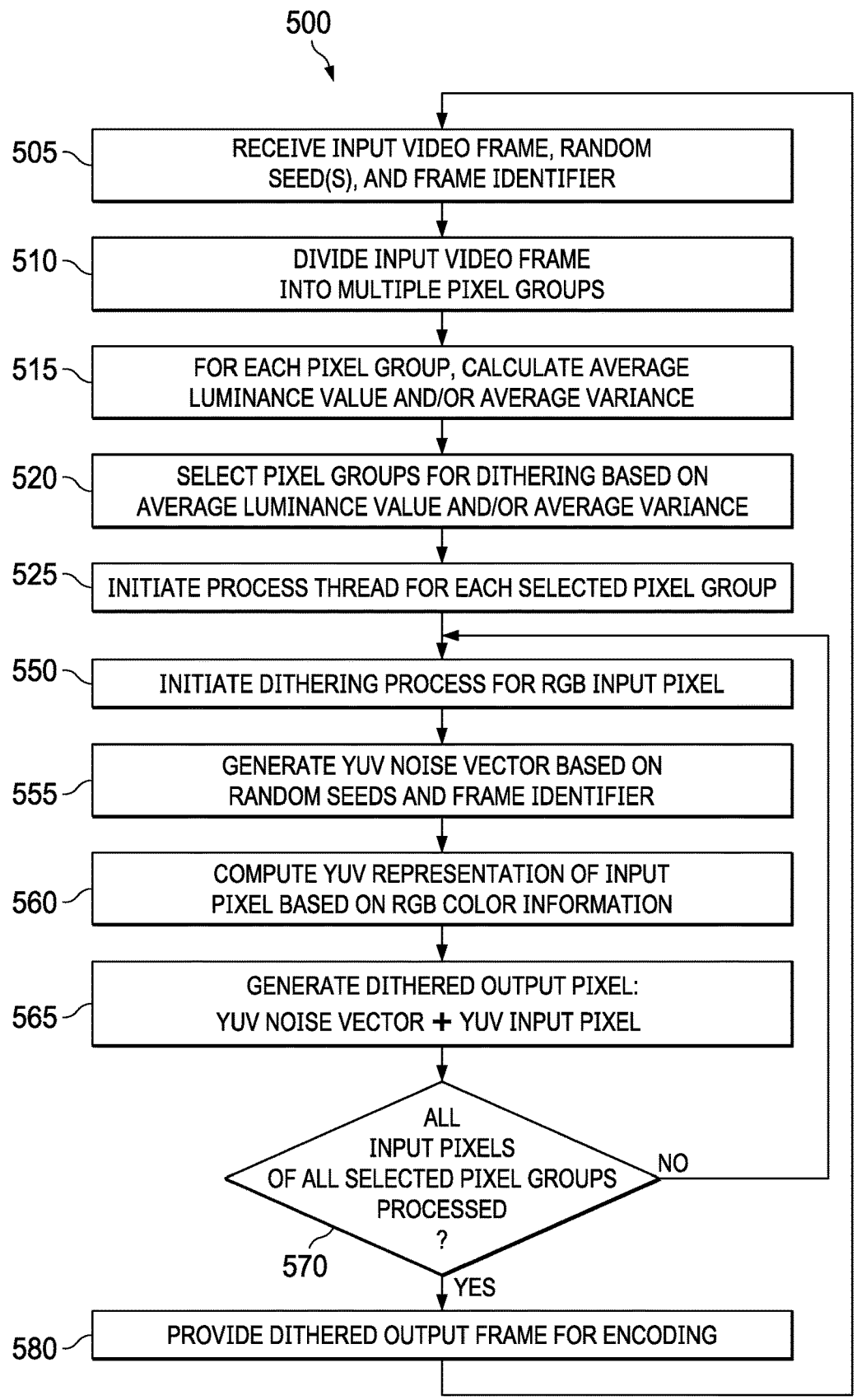
FIG. 5 is a block diagram illustrating an overview of operations of a real-time pre-encoding dithering system in accordance with one or more embodiments.

FIG. 5 is a block diagram illustrating an overview of an operational routine 500 of a processor-based real-time pre-encoding dithering system (such as any of servers 104 of FIG. 1, or computing system 700 of FIG. 7, discussed below) in accordance with one or more embodiments. As with the example operational routine 300 of FIG. 3, in certain embodiments the operational routine 500 may be performed in real-time (e.g., as each video frame of a larger video stream is generated) in order to prepare one or more video image frames for encoding and transmission, such as if such video image frames are generated as part of sequential output from a game application being executed by one or more servers of a cloud gaming platform.

The routine begins at block 505, in which a processor-based dithering system receives an input video frame, a frame identifier, and one or more random seeds. In various embodiments, the random seeds and frame identifier may be generated by a first processor, such as a single- or multi-core CPU, and provided to a distinct second processor (such as a single- or multi-core GPU) for dithering and/or other operations prior to the encoding of the input video frame for transmission to one or more client devices. The routine proceeds to block 510.

At block 510, the processor-based dithering system divides the input video frame into multiple pixel groups. As one example, an input video frame may be divided into similarly or identically dimensioned pixel groups of 32×32 pixels each, such that the input video frame comprises (image_width*image_height)/32 distinct pixel groups. The routine proceeds to block 515.

At block 515, the processor-based dithering system calculates an average luminance value and/or average variance for each pixel group in the input video frame. Continuing the example outlined above, an average luminance and/or average variance is therefore computed for each of the 32*32=1024 pixels of each pixel group. The routine proceeds to block 520.

At block 520, the processor-based system dynamically selects one or more of the pixel groups for dithering, such as based on the calculated average luminance value and/or the calculated average variance of the respective pixel group. For example, in certain embodiments, the processor-based system may calculate a magnitude of an adaptive coefficient in a range of 0.0-1.0 that combines the calculated average luminance value and the calculated average variance of each respective pixel group. Such calculations may be expressed as a set of pseudo-instructions that each may be effectuated as one or more computer-readable instructions, as follows:

Compute block_avg_luma=average luminance of pixels in pixel group

Compute block_avg_variance=average variance of pixels in pixel group alpha=softclip(block_avg_luma, L1, L2) where L1,L2 are two luminance thresholds beta=softclip(block_avg_variance, V1, V2) where V1,V2 are two variance thresholds Calculate adaptive_coeff=alpha*beta In certain embodiments, the softclip function indicated above may return a floating-point value that may be defined as:

```
float softclip(data, a, b) {
    if (data <= a) return 1.0;
    else if (data>=b) return 0;
    else return 1-(data-a)/(b-a);
}
``` where data is an input value for comparison with threshold input values a and b. Based on the calculated adaptive coefficient (adaptive_coeff in the above pseudo code), which is further based on average luminance and average variance of a pixel group, a pixel group is dynamically selected for dithering or not. For example, in one embodiment only pixel groups for which a respective adaptive coefficient is above a pre-defined threshold value will be selected for dithering.

Once the selected pixel groups for dithering have been dynamically determined, the routine proceeds to block 545, in which a process thread for each selected pixel group is initiated. In certain embodiments, initiating such process threads involves creating a two-dimensional thread-space for the performing processor, such as via one or more shader modules of a GPU tasked with pre-encoding operations for a video stream. The routine then proceeds to block 550.

At block 550, the processor-based dithering system initiates a dithering process for an input pixel associated with color values provided in the RGB (red-green-blue) domain. As noted above, in the depicted embodiment the dithering process may be initiated by a separate process thread for each pixel group that has been dynamically selected for dithering. The routine proceeds to block 555 as part of that dithering process.

At block 555, the processor-based dithering system generates a noise vector in the YUV domain based on the received random seeds and frame identifier associated with the input video frame.

In certain embodiments the generation of the YUV noise vector may include the following operations, again expressed as a set of pseudo-instructions that each may be effectuated as one or more computer-readable instructions:

Read the RGB values associated with the current input pixel: input_color=[r,g,b]

Set an aggregated RGB value total_rgb to input.r+input.g+input.b

Compute a random number for each RGB channel based on the random seed(s):

grain0=(sine_noise(shared_sample_id+uvec2 (33*seed0*total_rgb, 9*seed0*total_rgb))+euler_ noise(global_sample_id.yx,seed0))-1.0 grain1=(sine_noise(shared_sample_id.yx+uvec2 (13*seed1*total_rgb, 7*seed1*total_rgb))+euler_ noise(global_sample_id,seed1))-1.0 grain2=(sine_noise(shared_sample_id+uvec2 (19*seed2*total_rgb, 31*seed2*total_rgb))+euler_ noise(output_resolution-global_sample_id,seed2))-1.0

Generate an RGB noise vector as noise_rgb=[nr,ng,nb], where nr=grain0, ng=grain1,nb=grain2

Set a noise strength factor strength_factor to a value between 0.0 and 1.0.

Scale the generated RGB noise vector by the noise strength factor [nr',ng',nb']=[nr,ng,nb]*strength_factor Convert the (optionally scaled) RGB noise vector [nr',ng',nb'] to a YUV-domain noise vector [ny',nu',nv']

As noted above with respect to operational routine 300 of FIG. 3, setting the noise strength factor and scaling the generated RGB noise vector by that noise strength factor may be omitted.

After generating the YUV noise vector, the routine proceeds to block 560, and computes a YUV representation of the input pixel based on the RGB color information associated with that input pixel. Expressed as a pseudo-instruction in a manner similar to that used above, [r,g,b] is converted to [y,u,v]. The routine then proceeds to block 565.

At block 565, the processor-based dithering system generates a dithered output pixel by adding the generated YUV noise vector to the converted YUV representation of the original input pixel, such that dithered output pixel [y',u',v']= [y,u,v]+[ny',nu',nv']. The routine then proceeds to block 570, in which the processor-based dithering system determines whether all input pixels of all selected pixel groups within the received input video frame have been processed. If not (such as if one or more initiated process threads have not yet completed processing of their respective pixel groups), the routine returns to block 550 and initiates the dithering process for the next input pixel of the input video frame.

If it is determined in block 570 that all input pixels of the input video frame have been processed, the routine proceeds to block 575, in which the processor-based dithering system provides a dithered output video frame for encoding and transmission. In certain embodiments, the processor-based dithering system may additionally apply one or more filters to the dithered output pixels prior to providing the data output video frame for encoding. As one non-limiting example, a Gaussian filter may be applied, such as using a five-tap 3×3 kernel similar to that noted above with respect to operational routine 300 of FIG. 3.

After providing the dithered output video frame for encoding and transmission, the routine then returns to block 505 in order to process a next video frame.

Figure 6:
FIG. 6 depicts an image of a video frame that has been processed by a real-time pre-encoding dithering system in accordance with one or more embodiments.

FIG. 6 depicts an image of a video frame 600 that has been processed by a real-time pre-encoding dithering system in accordance with one or more embodiments. As part of such processing, the depicted video frame 600 is divided into a quantity of distinct pixel groups, such as described elsewhere herein with respect to video frame 400 of FIG. 4 and operational routine 500 of FIG. 5. In comparison with the corresponding areas of 105 of FIG. 1, the processed areas 605 of video frame 600 display significantly diminished graphical artifacts, and no apparent banding. While the still depiction of video frame 600 includes visible added noise, it will be appreciated that human vision is generally insensitive to such noise during actual video playback.

In testing, the dithering of 4 k resolution video frames incurred a processing time of less than 600 microseconds per input video frame on a variety of hardware test platforms and graphics processors, indicating that the techniques described herein are fast enough to support real-time cloud gaming.

Figure 7:
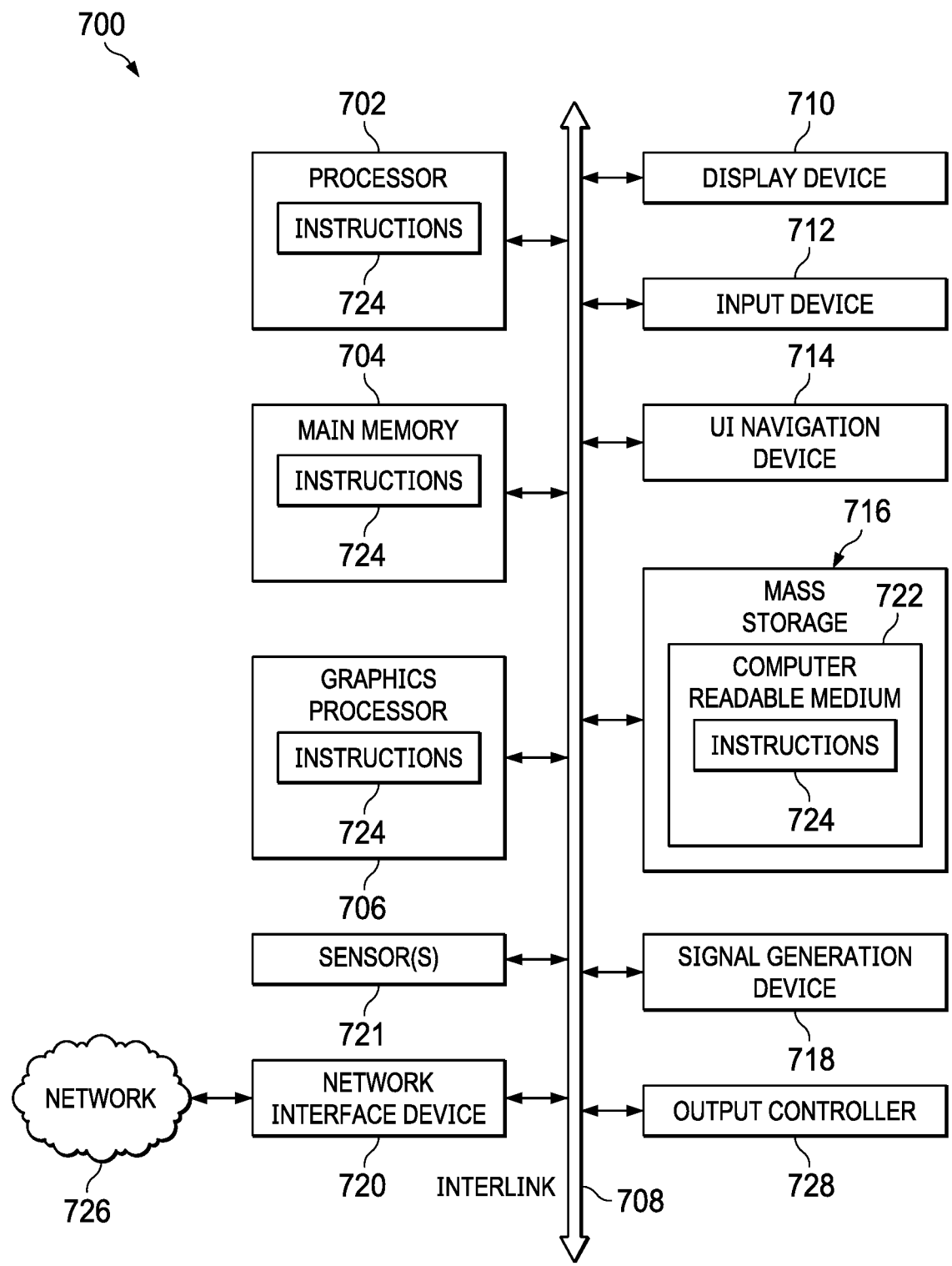
FIG. 7 is a component-level block diagram illustrating an example of a computing system suitable for implementing one or more embodiments.

FIG. 7 is a component-level block diagram illustrating an example of a computing system 700 suitable for implementing one or more embodiments. In alternative embodiments, the computing system 700 may operate as a standalone device or may be connected (e.g., networked) to other systems. In various embodiments, one or more components of the computing system 700 may be incorporated as or within one or more server computing systems to provide various types of game application output or other video content. It will be appreciated that an associated server computing device may include some components of computing system 700, but not necessarily all of them. In a networked deployment, the computing system 700 may operate in the capacity of a server machine, a client machine, or both in server-client network environments. In at least one example, the computing system 700 may act as a peer system in peer-to-peer (P2P) (or other distributed) network environment. The computing system 700 may be a server computer, a personal computer (PC), a tablet PC, a set-top box (STB), a mobile computing device, a web appliance, a network router, switch or bridge, or any system capable of executing instructions (sequential or otherwise) that specify actions to be taken by that system. Further, while only a single system is illustrated, the term "system" shall also be taken to include any collection of systems that individually or jointly execute a set (or multiple sets) of instructions to perform any one or more of the methodologies discussed herein, such as cloud computing, software as a service (SaaS), other computer cluster configurations.

Examples, as described herein, may include, or may operate by, logic or a number of components, or mechanisms. Circuitry is a collection of circuits implemented in tangible entities that include hardware (e.g., simple circuits, gates, logic, etc.). Circuitry membership may be flexible over time and underlying hardware variability. Circuitries include members that may, alone or in combination, perform specified operations when operating. In an example, hardware of the circuitry may be immutably designed to carry out a specific operation (e.g., hardwired). In an example, the hardware of the circuitry may include variably connected physical components (e.g., execution units, transistors, simple circuits, etc.) including a computer readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, the computer readable medium is communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time.

The computing system 700 may include one or more hardware processors 702 (e.g., a central processing unit (CPU), a hardware processor core, or any combination thereof), a main memory 704, and a graphics processing unit (GPU) 706, some or all of which may communicate with each other via an interlink (e.g., bus) 708. The computing system 700 may further include a display unit 710 (such as a display monitor or other display device), an alphanumeric input device 712 (e.g., a keyboard or other physical or touch-based actuators), and a user interface (UI) navigation device 714 (e.g., a mouse or other pointing device, such as a touch-based interface). In one example, the display unit 710, input device 712, and UI navigation device 714 may comprise a touch screen display. The computing system 700 may additionally include a storage device 716 (e.g., a hard drive unit), a signal generation device 718 (e.g., a speaker), a network interface device 720, and one or more sensors 721, such as a global positioning system (GPS) sensor, compass, accelerometer, or other sensor. The computing system 700 may include an output controller 728, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 716 may include a computer readable medium 722 on which is stored one or more sets of data structures or instructions 724 (e.g., software) embodying or utilized by any one or more of the techniques or functions described herein. The instructions 724 may also reside, completely or at least partially, within the main memory 704, within GPU 706, or within the hardware processor 702 during execution thereof by the computing system 700. In an example, one or any combination of the hardware processor 702, the main memory 704, the GPU 706, or the storage device 716 may constitute computer readable media.

While the computer readable medium 722 is illustrated as a single medium, the term "computer readable medium" may include a single medium or multiple media (e.g., a centralized or distributed database, and/or associated caches and servers) configured to store the one or more instructions 724.

The term "computer readable medium" may include any medium that is capable of storing, encoding, or carrying instructions for execution by the computing system 700 and that cause the computing system 700 to perform any one or more of the techniques of the present disclosure, or that is capable of storing, encoding or carrying data structures used by or associated with such instructions. Non-limiting computer readable medium examples may include solid-state memories, and optical and magnetic media. In an example, a massed computer readable medium comprises a computer readable medium with a plurality of particles having invariant (e.g., rest) mass. Accordingly, massed computer readable media are not transitory propagating signals. Specific examples of massed computer readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 724 may further be transmitted or received over a communications network 726 using a transmission medium via the network interface device 720 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 720 may include one or more physical jacks (e.g., Ethernet, coaxial, or phone jacks) or one or more antennas to connect to the communications network 726. In an example, the network interface device 720 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the computing system 700, and includes digital or analog communications signals or other intangible medium to facilitate communication of such software.

In some embodiments, certain aspects of the techniques described above may implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A computer-implemented method comprising:
   for each of one or more input video frames:
      receiving one or more random seeds and a frame identifier;
      for each of multiple input pixels of the input video frame, initiating a dithering process that includes:
         generating a red-green-blue (RGB) noise vector based at least in part on the one or more random seeds and on the frame identifier;
         computing a YUV noise vector by converting the generated RGB noise vector to a YUV representation of the RGB noise vector;
         computing a YUV representation of the input pixel based on RGB color information for the input pixel; and
         generating a dithered output pixel by adding the generated YUV noise vector to the YUV representation of the input pixel; and
      providing a dithered output video frame for encoding that includes the dithered output pixels.

2. The method of claim 1, further comprising, for each of at least one of the one or more input video frames:
   dividing the at least one input video frame into multiple pixel groups of substantially similar dimensions, and
   dynamically determining, for each respective pixel group of the multiple pixel groups, whether to initiate the dithering process with respect to the respective pixel group.

3. The method of claim 2, wherein dynamically determining whether to initiate the dithering process with respect to the respective pixel group is based at least in part on an average luminance value of pixels of the respective pixel group.

4. The method of claim 2, wherein determining whether to initiate the dithering process with respect to the respective pixel group is based at least in part on an average variance of pixels of the respective pixel group.

5. The method of claim 2, further comprising initiating a process thread for each pixel group for which it is dynamically determined to initiate the dithering process, such that each respective process thread performs the dithering process for pixels of the respective pixel group.

6. The method of claim 1, wherein generating the YUV noise vector further comprises scaling the RGB noise vector by a defined strength factor.

7. The method of claim 1, further comprising applying one or more filters to the dithered output pixels prior to providing the dithered output video frame for encoding.

8. The method of claim 7, wherein the one or more filters include at least one Gaussian filter.

9. A system comprising at least one processor and a memory coupled to the at least one processor and storing a set of executable instructions, that when executed by the at least one processor, manipulate the at least one processor to perform the method of claim 1.

10. A system, comprising:
a first processor to:
receive, for each of one or more input video frames and from a second processor, one or more random seeds and a frame identifier;
initiate, for each of multiple input pixels of the input video frame, a dithering process that includes to:
generate a red-green-blue (RGB) noise vector based at least in part on the one or more random seeds and on the frame identifier;
generate a YUV noise vector by converting the generated RGB noise vector to a YUV representation of the RGB noise vector;
compute a YUV representation of the input pixel based on RGB color information for the input pixel; and
generate a dithered output pixel by adding the generated YUV noise vector to the YUV representation of the input pixel; and
provide, for each of the one or more input video frames, a dithered output video frame for encoding that includes the dithered output pixels.

11. The system of claim 10, wherein the first processor is further to, for at least one of the one or more input video frames:
divide the at least one input video frame into multiple pixel groups of substantially similar dimensions, and
dynamically determine, for each respective pixel group of the multiple pixel groups, whether to initiate the dithering process with respect to the respective pixel group.

12. The system of claim 11, wherein to dynamically determine whether to initiate the dithering process with respect to the respective pixel group is based at least in part on one or more of an average luminance value of pixels of the respective pixel group and an average variance of pixels of the respective pixel group.

13. The system of claim 11, wherein the first processor is further to initiate a process thread for each pixel group for which it is dynamically determined to initiate the dithering process, such that each respective process thread performs the dithering process for pixels of the respective pixel group.

14. The system of claim 10, wherein the first processor is further to apply one or more Gaussian filters to the dithered output pixels prior to providing the dithered output video frame for encoding.

15. The system of claim 10, further comprising the second processor.

16. A server computing system, comprising:
a set of one or more processors to:
generate one or more input video frames; and
for each of the one or more input video frames:
generate a frame identifier and one or more random seeds;
for each of multiple input pixels of the input video frame:
generate a red-green-blue (RGB) noise vector based at least in part on the one or more random seeds and on the frame identifier;
compute a YUV noise vector by converting the generated RGB noise vector to a YUV representation of the RGB noise vector;
compute a YUV representation of the input pixel based on red-green-blue (RGB) color information for the input pixel; and
generate a dithered output pixel by adding the generated YUV noise vector to the YUV representation of the input pixel; and
encode a dithered output video frame that includes the dithered output pixels; and
a network interface that is coupled to the set of one or more processors and that is configured to provide encoded output video frames to one or more client computing systems via at least one computer network.

17. The server computing system of claim 16, wherein the set of one or more processors is further to, for at least one of the one or more input video frames:
divide the at least one input video frame into multiple pixel groups of substantially similar dimensions, and
dynamically determine, for each respective pixel group of the multiple pixel groups, whether to initiate a dithering process with respect to the respective pixel group.

18. The server computing system of claim 17, wherein to dynamically determine whether to initiate the dithering process with respect to the respective pixel group is based at least in part on one or more of an average luminance value of pixels of the respective pixel group and an average variance of pixels of the respective pixel group.

19. The server computing system of claim 17, wherein the set of one or more processors is further to initiate a process thread for each pixel group for which it is dynamically determined to initiate the dithering process, such that each respective process thread performs the dithering process for pixels of the respective pixel group.

* * * * *